April 24, 1934.  W. Y. BROWN  1,956,144

LUBRICATION APPARATUS

Filed May 25, 1933  2 Sheets-Sheet 1

Inventor:
William Y. Brown
By Paul S. Eaton
Attorney

April 24, 1934. W. Y. BROWN 1,956,144
LUBRICATION APPARATUS
Filed May 25, 1933 2 Sheets-Sheet 2

Inventor:
WILLIAM Y. BROWN
By Paul S Eaton
Attorney

Patented Apr. 24, 1934

1,956,144

UNITED STATES PATENT OFFICE 1,956,144

LUBRICATION APPARATUS

William Y. Brown, Charlotte, N. C., assignor of one-third to William C. Honeycutt, Black Mountain, N. C., and one-third to Robert H. Garland, Charlotte, N. C.

Application May 25, 1933, Serial No. 672,864

12 Claims. (Cl. 221—47.1)

This invention relates to a lubricating machine and more especially to a grease gun that is adapted to be used for the lubrication of bearing on machinery such as automobiles and the like.

It is a well known fact that heretofore lubricating apparatus has been stationary with hose leading therefrom and in order to lubricate an automobile or other piece of machinery, it has been necessary to move the automobile and the like to close proximity to the lubrication apparatus. Furthermore, some of the grease guns operated under these conditions do not develop sufficient power to force the lubrication into bearings clogged with hardened lubricant or even to grease certain bearings of trucks or automobiles without first taking the load from the bearing.

It is an object of this invention to provide a portable lubricating unit having in combination a motor and a suitable source of self-contained power such as a storage battery for driving the motor, which may be carried to the machinery and put into operation with ease.

It is a further object of this invention to provide a grease gun which has a piston that is reciprocated in both directions by the same means, such as an eccentric mounted in a Scotch yoke. This gives a positive movement of the piston in both directions and greatly increases the efficiency of the grease gun.

Another object of this invention is to provide an adjustable safety clutch in combination with a grease gun which is located between the motor and the piston. When the desired pressure has been created, the clutch will slip. This prevents excessive pressure from being applied which very often bursts the hose connections.

Some of the objects of the invention having been stated, other objects will more fully appear in the detailed description hereinafter given, when taken in connection with the accompanying drawings, in which—

Figure 1:
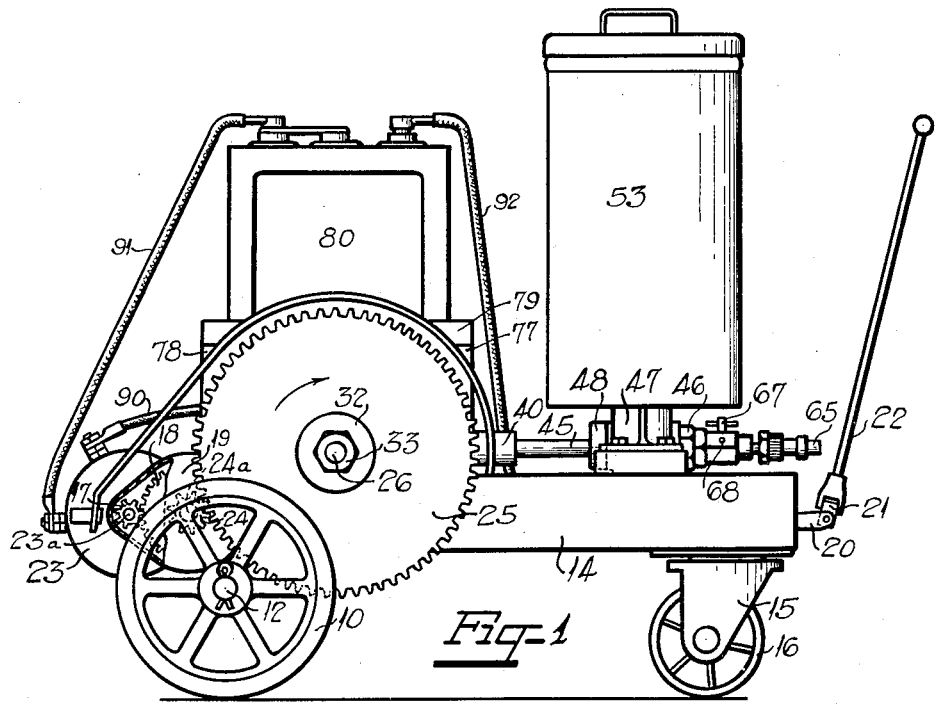
Figure 1 is an elevation of one side of the apparatus.

Referring more particularly to the drawings, the numerals 10 and 11 indicate the rear wheels of the apparatus which are rotatably mounted on axle 12 upon which is secured a suitable bolster 13 by any suitable means such as welding. Upon bolster 13 one end of rectangular frame 14 is adapted to rest and the other end of frame 14 is supported by a caster 15 which projects downwardly and has mounted in the lower end thereof a front wheel 16. Caster 15 is mounted for rotation about its vertical axis, thereby allowing wheel 16 to be the pilot wheel when the apparatus is moved from one place to another. From the front end of frame 14 a stud 20 projects and in the end of this stud a link 21 is pivotally mounted. Pivotally secured to link 21 is a suitable tongue 22 for pulling the apparatus from place to place.

Secured to the rear end of frame 14 is a suitable electric motor 23 which is adapted to drive spur gear 24 mounted on shaft 24a, shaft 24a being driven by any suitable means such as a pinion 17 mounted on motor shaft 23a, and meshing with a larger gear 18 fixed on shaft 24a. The pinion 17 and gear 18 are disposed in a housing 19. Spur gear 24 is adapted to mesh with a still larger spur gear 25 which is loosely mounted on transverse shaft 26. Secured to the inner side of spur gear 25 by any suitable means such as screws 28 is a suitable friction disc 27 which is composed of any suitable material such as rubber or brake lining.

Disc 27 is adapted to engage another disc 29 which is fixedly secured to shaft 26 by any suitable means such as set screw 30. Spur gear 25 is confined on shaft 26 by compression spring 31, washer 32 and nuts 33. It is evident that by screwing nuts 33 on shaft 26 the spring 31 tends to force spur gear 25 and friction disc 27 to the left in Figure 4 which causes the surface of disc 27 to engage the surface of disc 29.

Shaft 26 is rotatably mounted in bearings 35 and 36 which are secured to the top of frame 14 by any suitable means such as stud bolts 37. Between bearings 35 and 36 an eccentric cam 38 is fixedly mounted on shaft 26. Cam 38 is adapted to rotate in Scotch yoke 39 and to cause shafts 40 and 41, integral with yoke 39, to reciprocate in bearings 42 and 43 respectively, which bearings are secured to the upper portion of frame 14 by any suitable means such as stud bolts 44.

Secured to the left hand end of shaft 40 (Fig. 3) is a piston 45 which is adapted to reciprocate in cylinder casing 46. This casing is secured in member 47 by any suitable means such as ring 48 which is threadably secured around one end of casing 46, thus holding it firmly in place on account of the other end of cylinder 46 being shouldered.

Member 47 projects upwardly and has on the upper end thereof a flanged portion 50 upon which a suitable container 53 is adapted to rest. Container 53 is secured to flanged portion 50 by any suitable means such as bolts 52. Slidably mounted on the inside of container 53 is a cap 54 which rests on top of the lubricant regardless of its level in the container and tends to exclude air as atmospheric pressure on its upper side causes it to follow the upper level of the grease. This prevents pockets from being formed in the lubricant as it is being drawn down through strainer 60, bore 61 and openings 62 into the inside of casing 46 where it is forced thru check valve 63, opening 64, hose 65 and out at nipple 66.

Figure 5:
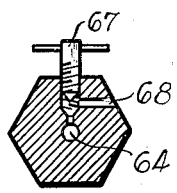
Figure 5 is a vertical sectional view taken along line 5—5 in Figure 3 but showing the valve in an open position.

When air pockets are in the line a suitable valve 67 is opened and the air is allowed to escape from bore 64 thru port 68. Figure 5 shows this valve in an open position but it is evident that it will be manually closed when the grease gun is in operation. By referring to Figures 3 and 4 it can be seen that when excessive pressure has been applied on piston 45 by cam 38 that disc 29 will stop rotation but friction disc 27 and spur gear 25 will continue to be rotated by the motor. The amount of pressure that piston 45 exerts upon the lubricant before slipping occurs between discs 27 and 29 is determined by the amount spring 31 is compressed by nuts 33 and washer 32.

Figure 3:
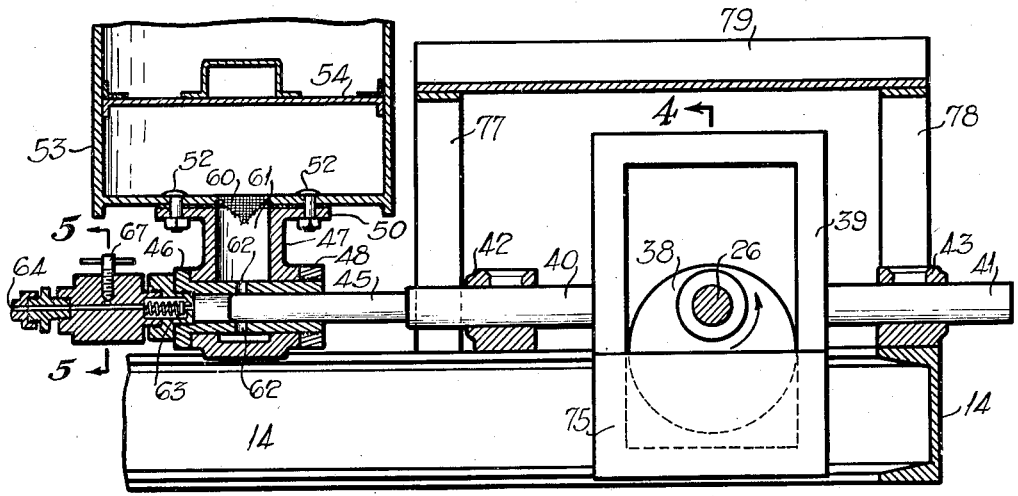
Figure 3 is a longitudinal sectional view through the central portion of the apparatus.

In Figure 3 piston 45 is shown as it travels to the right since check valve 63 is closed. In this position a vacuum is being created inside of casing 46 and when the piston moves past holes 62 the vacuum which has been created will draw the lubricant into the chamber. Each time shaft 26 and eccentric 38 makes a revolution piston 45 moves back and forth one time thereby filling the chamber 46 with a charge of lubricant and expelling the same therefrom into hose 65.

Figure 4:
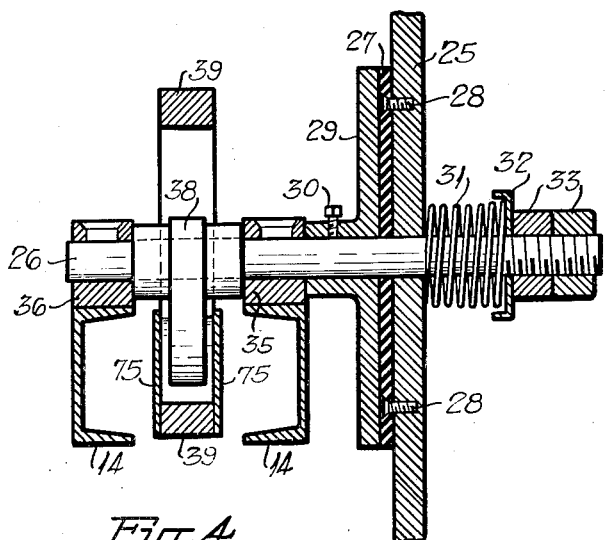
Figure 4 is a transverse sectional view taken along line 4—4 in Figure 3.

By referring to Figure 4 it will be seen that the lower portion of yoke 39 has a plate 75 secured on each side thereof which forms an oil reservoir. By providing this means of lubrication eccentric 38 is dipped in oil each time it rotates thereby keeping the contact surfaces oiled at all times.

A pair of inverted U-shaped members 77 and 78 are secured on top of frame 14 and these members project upwardly and have secured on their upper portion a suitable tray 79 which may be used to support a source of power such as a storage battery 6.

Figure 2:
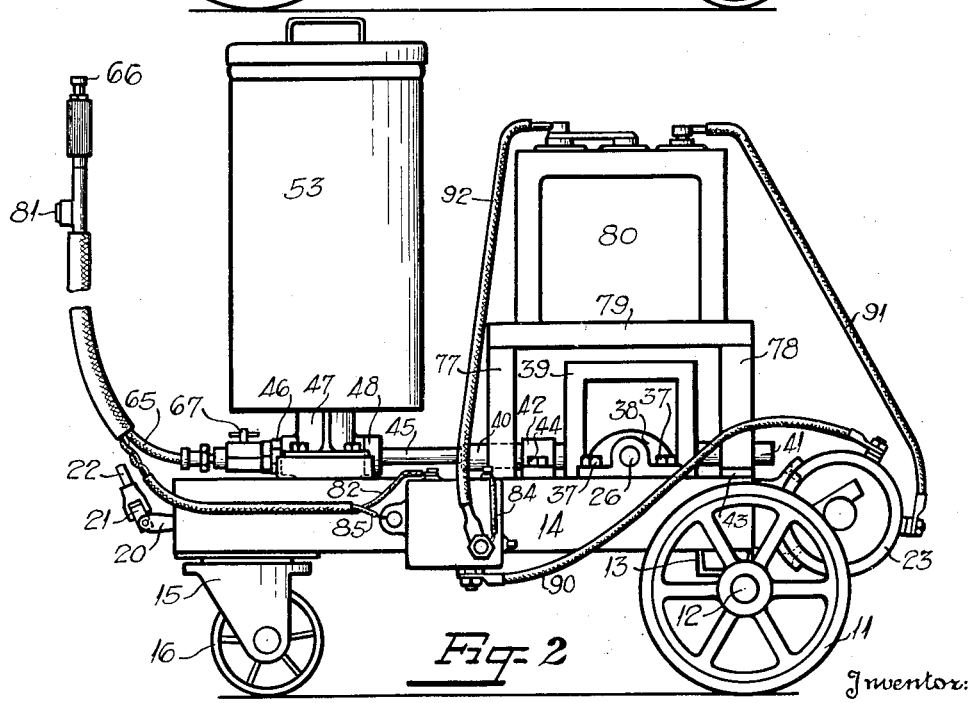
Figure 2 is an elevation of the other side of the apparatus.
Figure 6:
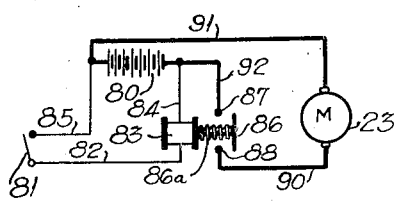
Figure 6 is a diagrammatic view of the electric wiring of the apparatus.

When it is desired to operate the apparatus, switch button 81 is pressed by the operator (Figs. 2 and 6). This causes the starting circuit which is comprised of wire 82, relay 83, wire 84, battery 80 and wire 85 to be completed which energizes relay 83 and causes switch 86 to contact terminals 87 and 88 and to close the main circuit. This main circuit is composed of wire 90, motor 23, wire 91, battery 80, wire 92 and switch 86. Since switch 86 is normally held in an open position by spring 86a the contact between this switch and terminals 87 and 88 is broken and the motor stopped when relay is de-energized and this is accomplished by releasing switch button 81.

In the drawings and specification, there has been set forth a preferred embodiment of the invention and although specific terms are employed, they are used in a generic and descriptive sense only and not for purposes of limitation, the scope of the invention being set forth in the appended claims.

I claim:

1. A pressure lubricating device comprising a wheeled framework, a lubricant reservoir on the framework, a pump in communication with the reservoir, a hose connected at one end to the pump, a suitable fitting on the other end of the hose whereby it may eject the lubricant under pressure into portions of machinery, driving means on the frame work for said pump, an electric motor connected to the driving means, a storage battery for driving said electric motor, and means on the hose for connecting the battery to the motor.

2. Lubrication apparatus comprising a portable framework, a storage battery mounted on said framework, a pressure creating device on said framework, connections between said storage battery and said pressure creating device, a lubricant reservoir on said framework and having connection with said pressure creating device, a conduit connected to said pressure creating device, and a switch on the conduit for connecting the battery to said pressure creating device.

3. Lubrication apparatus comprising a portable framework, a grease gun on said framework, a storage battery supported by the framework for driving the grease gun, a hose extending from the grease gun for receiving the grease under pressure and a switch mounted on the hose and connected to the battery for controlling the operation of the grease gun.

4. Lubrication apparatus comprising a portable framework, a grease gun mounted on said framework, a storage battery supported by the framework, an electric motor for driving the grease gun, driving connections between the battery and the grease gun, a hose extending from the grease gun through which grease is expelled under pressure and a switch on the hose having connection with the battery for connecting the battery to said driving means.

5. A pressure lubricating device comprising a wheeled framework, a lubricant reservoir on the framework, a pump in communication with the reservoir, a hose connected at one end to the pump, a suitable fitting on the other end of the hose whereby it may eject the lubricant under pressure into portions of machinery, driving means on the framework for said pump, comprising an electric motor and a storage battery for driving the electric motor, and means on the hose for controlling the operation of said driving means and a friction clutch in the driving means.

6. Lubrication apparatus comprising a portable framework, a grease gun mounted on said framework, a storage battery supported by the framework, driving means for the grease gun, connections between the storage battery and the driving means, a hose extending from the grease gun through which grease is expelled under pressure and means on the hose for connecting the storage battery to said driving means and a friction clutch in said driving means.

7. Lubrication apparatus comprising a portable framework and having in combination on said framework a lubricant pump, a hose extending from the pump, a lubricant reservoir connected to said pump, an electric motor, driving connections between the electric motor and said pump, an electric storage battery having connections with said motor, and a circuit extending from said battery along said hose whereby an operator of said hose may control the operation of said motor.

8. Lubrication apparatus comprising a portable framework and having in combination on said framework a lubricant pump, a hose extending from the pump, a lubricant reservoir connected to said pump, an electric motor, driving connections between the electric motor and said pump, a friction clutch disposed in the driving connections between said motor and said pump, an electric storage battery having connections with said motor and a circuit extending from said battery along said hose whereby an operator of said hose may control the operation of said motor.

9. Lubrication apparatus comprising a portable framework having thereon a pump, a lubricant reservoir connected to the intake side of said pump, a hose extending from the output end of said pump, an electric motor, driving connections between said motor and said pump, a friction clutch in said driving connections, an electric storage battery on said framework, an electric circuit between said motor and said battery, a magnetic switch in said circuit, a control circuit connected to said battery, and said switch and extending along said hose, and a manually operated switch in said control circuit and being mounted on said hose whereby an operator using the hose can control the operation of the motor.

10. Lubrication apparatus comprising a pump cylinder having a reciprocable piston therein, means for driving the piston comprising a Scotch yoke connected to the piston, said Scotch yoke having a transversely disposed slot therein, plates secured on the lower side portions of the Scotch yoke forming a lubricant chamber, an eccentric cam mounted for rotation in said slot and means for driving said eccentric cam to impart reciprocating motion to the piston.

11. Lubrication apparatus comprising a pump cylinder having a reciprocable piston therein, means for driving the piston comprising a vertically disposed Scotch yoke connected to the piston, said Scotch yoke having a transversely disposed slot therein, plates secured on the lower side portions of the Scotch yoke forming a lubricant chamber, an eccentric cam mounted for rotation in said slot and means for driving said eccentric cam to impart reciprocating motion to the piston, and a friction clutch in said driving means for said eccentric cam.

12. In a grease gun, a wheeled framework, an electric motor mounted on the framework, a grease gun mounted on the framework, driving connections between the motor and the grease gun, a storage battery mounted on the framework and having a circuit leading therefrom to the motor, a switch in said circuit, a hose connected at one end to the discharge end of the grease gun and having means on its free end for connection to a bearing to be lubricated, a manually operated switch on the free end of said hose, electromagnetic means for closing said switch in said circuit, a second circuit disposed on said hose and having connections with the battery and said electro-magnetic switch whereby the motor can be connected to and disconnected from the battery by the operator in charge of the end of the hose.

WILLIAM Y. BROWN.